Dec. 25, 1956 R. J. ROBERTS 2,775,058
FISHHOOK
Filed March 18, 1954
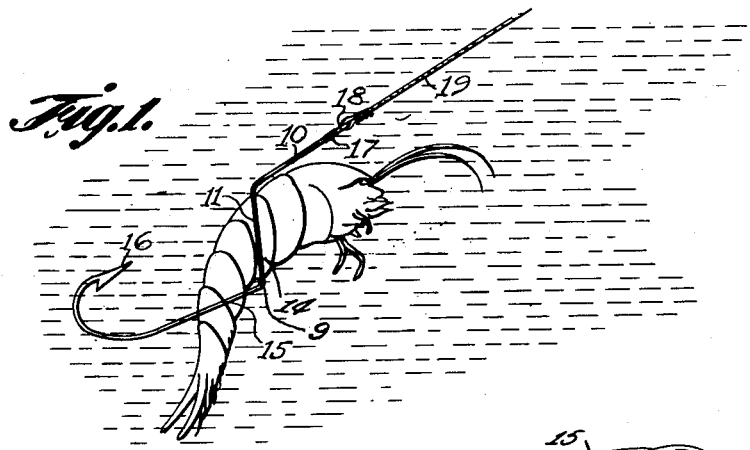
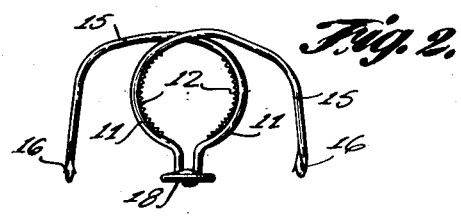
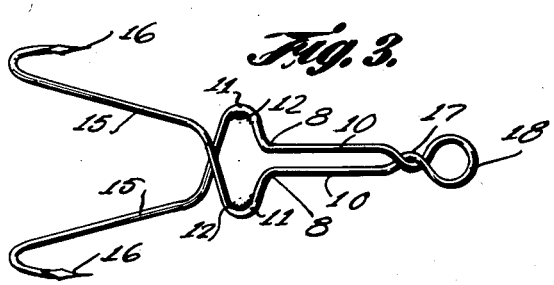
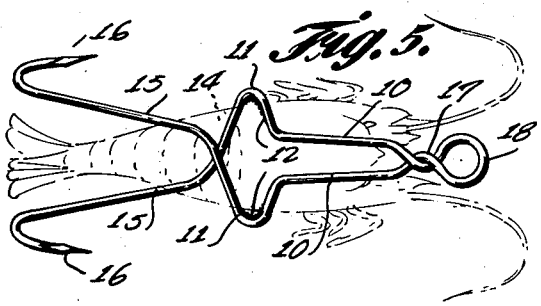
INVENTOR.
Roy J. Roberts
BY Victor J. Evans & Co.
ATTORNEYS

# United States Patent Office 2,775,058
Patented Dec. 25, 1956

2,775,058

FISHHOOK

Roy J. Roberts, Corpus Christi, Tex., assignor of one-half to Jake B. Jarmon, Jr., Corpus Christi, Tex.

Application March 18, 1954, Serial No. 417,163

2 Claims. (Cl. 43—44.4)

This invention relates to a fishhook, and more particularly to a gang type fishhook for holding and keeping alive the bait.

The object of the invention is to provide a fishhook which is adapted to resiliently hold live bait such as shrimp, the bait being readily manually removed or inserted in the present invention.

Another object of the invention is to provide a fishhook which is adapted to be made of a suitable material such as spring wire wherein shrimp or other live bait can be held in a harmless manner in a device so designed that the center of gravity is below the center of gravity of the bait in its grasp, so that the bait will always be kept in a normal or upright position.

Another object of the invention is to provide a fishhook wherein the longitudinal line passing through the center of gravity of the device is in such a position that if the hook is allowed to settle to the bottom of the water it will always land with the bait upright and the barbed portions turned up from the bottom in order not to interfere with the device being pulled along the bottom as for example in the manner of a sled proceeding over ice and whereby the barbed parts of the hooks will be in position to snare any fish that tried to take the bait.

Other objects and advantages will be apparent during the course of the following description.

In the accompanying drawings, forming a part of this application, and in which like numerals are used to designate like parts throughout the same:

Figure 1 is a side elevational view showing the fishhook of the present invention in use.

Figure 2 is an end elevational view of the fishhook assembly, with the device turned upside down.

Figure 3 is a top plan view of the present invention.

Figure 4 is an end elevational view of the fishhook, with the device turned upside down, showing manual pressure applied thereon when bait is to be inserted.

Figure 5 is a top plan view showing the fishhook and with the bait such as shrimp shown in dotted or broken lines.

Referring in detail to the drawings, there is shown a fishhook which is adapted to be made of a single piece of springy metal or material such as spring wire having inherent resiliency. The fishhook includes a pair of arms 10 that are arranged angularly with respect to each other, Figure 5, when in use. Extending from an end of each of the arms 10 and arranged angularly with respect thereto is a curved socket member 11. Each of the pair of socket members 11 is provided with barbs or knurling 12 whereby when live bait such as the shrimp 14 is gripped between the socket members 11, the knurling 12 will prevent accidental disengagement of the bait from the hook. The socket members 11 are arranged angularly downwardly with respect to the arms 10 and lie in a plane arranged angularly with respect to the plane of said arms.

Extending from each of the socket members 11 and formed integral therewith is a finger 15. The fingers 15 are arranged angularly with respect to the socket members 11. A barb 16 projects forwardly from the rear end of each of the fingers 15.

The front ends of the arms 10 are twisted together as at 17, and the forward portions of these arms are interconnected together by a loop 18. A suitable fishing line 19 is adapted to be connected to the loop 18. The numeral 9 designates the lower end of a socket member, while the numeral 8 indicates the rear end of the arm.

From the foregoing it is apparent that there has been provided a fishhook which is adapted to be used for holding live bait such as the shrimp 14. In use a fishing line is connected to the loop 18, and the assembly of the present invention is adapted to be fabricated of a single piece of material such as wire having resiliency. When the bait 14 is to be clamped in place as shown in Figures 1 and 5, it is only necessary to manually apply pressure to the fingers 15 as shown in Figure 4 whereby the socket members 11 can be moved far enough apart to permit insertion of the bait 14. Then, when manual pressure is released on the fingers 15 the inherent resiliency of the material will cause the bait 14 to be gripped between the socket members 11 as shown in Figures 1 and 5. Then, as the hook is pulled through the water by means of the line 19, the bait 14 will provide an effective and attractive lure so that the fish can be caught on the barb 16. The knurled or roughened portion 12 of the socket members 11 provides a gripping means to prevent accidental disengagement of the bait from the device.

The primary purpose of the present invention is to grasp a shrimp or other live bait 14 in a harmless manner so as to keep the bait alive for a longer period of time than is possible with an ordinary type hook. The gang hook can be made of any suitable material such as a high tensile metal that has a spring-like effect and by exerting inward manual pressure upon each of the fingers 15, the space between the socket members 11 can be enlarged to permit insertion of the bait. After the bait has been inserted, the pressure is released so that there will be a gentle pressure applied around the bait 14. The roughened surface 12 provides a firmer grasp upon the bait.

The fishhook of the present invention will hold the bait in a harmless manner and its center of gravity is below the center of gravity of the bait in its grasp so that the bait will always be kept in a normal or upright position. Even if the hook settles to the bottom of the water it will always land with the bait upright and the barbed portions turned up from the bottom so as not to interfere with the device being pulled along the bottom, and wherein the barbed portions of the hooks will snare any fish that tried to take the bait.

I claim:

1. As a new article of manufacture, a fishhook shaped to include a pair of arms lying in a plane and having their rear ends arranged in spaced apart relation with respect to each other, a curved socket member extending from the rear end of each of said arms, said socket members coacting to grip bait therebetween, said socket members being arranged angularly downwardly with respect to said arms and lying in a plane arranged angularly with respect to the plane of said arms, a finger extending from the lower end of each of said socket members, said fingers being mounted for movement towards and away from each other, said fingers being arranged angularly with respect to said socket members, a barb extending forwardly from each of said fingers, said fishhook being fabricated of a single piece of springy material, the front ends of said arms being twisted together and formed into a loop adapted to be connected to a fishing line, and gripping means on said socket members for engagement with the bait.

2. The fishhook as defined in claim 1, wherein the center of gravity of the fishhook is below the center of gravity of the bait in its grasp whereby the bait will be kept in a normal or upright position.

References Cited in the file of this patent

UNITED STATES PATENTS

| | | |
|---|---|---|
| 533,652 | Kittle | Feb. 5, 1895 |
| 990,095 | Balcom | Apr. 18, 1911 |
| 1,745,169 | Johnson | Jan. 28, 1930 |
| 1,862,187 | Lageson | June 7, 1932 |
| 2,162,739 | Mindex | June 20, 1939 |
| 2,425,587 | Zuravsky | Aug. 12, 1947 |
| 2,522,073 | Trada | Sept. 12, 1950 |
| 2,559,409 | Dohmeyer | July 3, 1951 |

FOREIGN PATENTS

| | | |
|---|---|---|
| 336,483 | France | Jan. 16, 1904 |
| 490,356 | Canada | Feb. 10, 1953 |